Oct. 7, 1924.

J. C. ZEHFUS 1,510,911

AIR CLEANING DEVICE

Filed Sept. 18, 1922

Inventor:
John C. Zehfus,

Patented Oct. 7, 1924.

1,510,911

UNITED STATES PATENT OFFICE.

JOHN C. ZEHFUS, OF CHICAGO, ILLINOIS.

AIR-CLEANING DEVICE.

Application filed September 18, 1922. Serial No. 588,858.

*To all whom it may concern:*

Be it known that I, JOHN C. ZEHFUS, a citizen of the United States of America, and a resident of Chicago, county of Cook, and State of Illinois, have invented a new and useful Improvement in Air-Cleaning Devices, of which the following is a specification.

This invention relates to air cleaning apparatus intend for use either to reclaim dust particles of one kind or another carried in suspension in the air, or to reclaim the air purified of particles of dust, dirt, or other impurities.

The main objects of this invention are to provide an air cleaning device of this kind having an improved construction and arrangement of screens for separating the particles of dust, etc., from the air; to provide improved means for removing from the screens such particles of dust as collect thereon and do not drop therefrom; to provide improved means for an air-tight juncture between the moving screen and the adjacent walls of the casing; to provide improved means for causing a substantially even distribution of the dust-laden air to the several screens of a polygonal-shaped air cleaning device of this kind; to provide improved power means for moving the dust screens; and to provide a device of this kind which is comparatively simple and inexpensive in construction, and effective and economical in operation.

An illustrative embodiment of this invention is shown in the accompanying drawings, in which—

Figure 1:
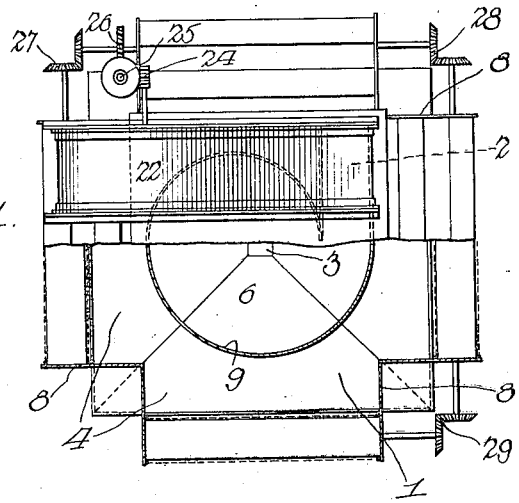
Figure 1 is a part plan and part horizontal sectional view of a rectangular-shaped air cleaning device constructed in accordance with this invention.
Figure 2:
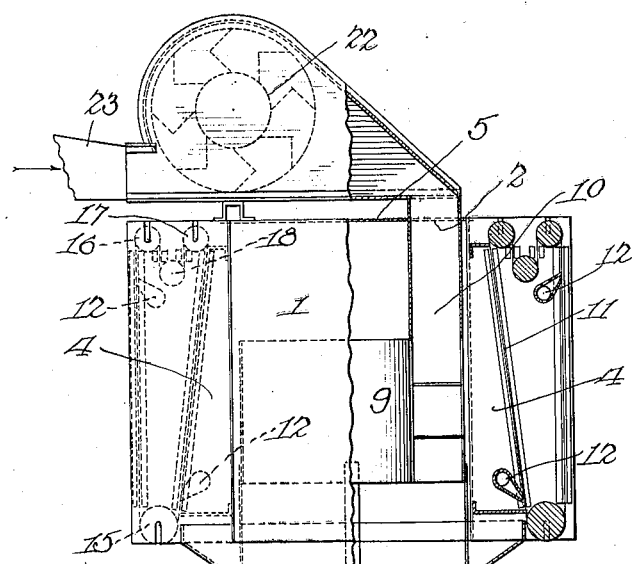
Fig. 2 is a part side and part sectional elevation of the same.

An air cleaning device embodying this invention involves the use of an endless traveling screen arranged across the path of the dust-laden air current, and having nozzles for an air suction system arranged transversely of the screen so as to remove the dust particles collected thereon. The ends of the rollers over which the screen travels are shaped to force the lateral edges of the screen into substantially air-tight contact with the adjacent casing walls, and the walls are provided with suitable guideways coacting with the lateral edges of said screen intermediate the rollers, to further insure a substantially air-tight contact between the screen and casing walls. The invention is intended for use either for the purpose of reclaiming dust particles from the dust-laden air of a factory or mill as, for instance, a flour mill, or for reclaiming purified air for reuse in a factory, mill, or other building, by removing from the air any dirt, dust, or other impurities carried in suspension.

The specific embodiment shown in the drawings is that of an air cleaning device intended to reclaim dust particles carried in suspension in a dust-laden air current. This specific embodiment comprises a casing 1, in the top of which is arranged an inlet 2 for dust-laden air, an outlet 3 for dust, and a plurality of air outlets 4 arranged in the sides of the casing.

The casing 1 is of suitable sheet metal construction and as herein shown is of rectangular cross section. The top 5 thereof is shown to be flat, and the bottom 6 is hopper-shaped, whereby dust falling to the bottom is directed to the dust outlet 3, from whence it is conveyed to suitable receptacles by a spiral conveyer mechanism 7. The vertical side walls of the casing are in the form of sheet metal angles 8 suitably arranged at the corners of the top and bottom so that one part of the angle piece forms the vertical side wall for one air outlet 4, and the other part forms the vertical side wall for the air outlet 4 at the adjacent side of the casing.

Within the casing 1 is a vertically arranged partition 9 of spiral formation, open at the top and bottom. The dust-laden air entering the inlet 2 is conveyed from said inlet and directed against the inner surface of said partition by means of a conduit 10. This spiral partition serves to diffuse the dust-laden air current so that its movement toward the several outlets is practically equalized, thus insuring a substantially even distribution of the dust-laden air to several screens.

Endless screens 11 of fabric construction are arranged to move in belt-like fashion across each of the air outlets 4, and have the dust collecting thereon removed therefrom by means of air suction nozzles 12.

Figure 3:
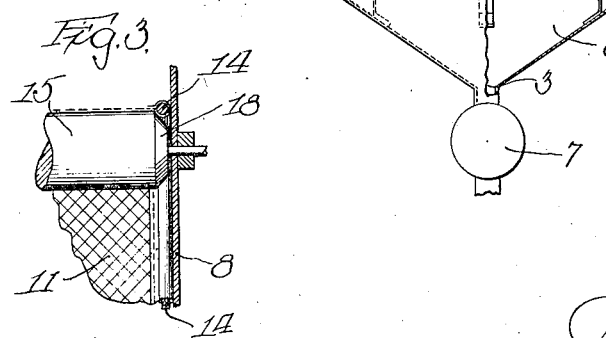
Fig. 3 is an enlarged sectional detail view showing the means by which the lateral edges of the screen are caused to form a substantially air-tight juncture with the adjacent casing wall.
Figure 4:
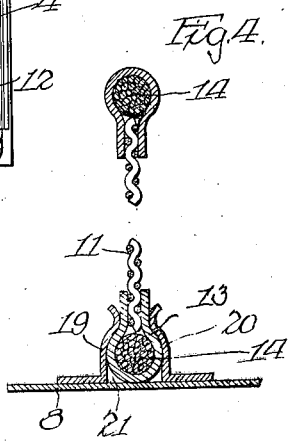
Fig. 4 is an enlarged cross sectional detail of one of the screens showing the construction thereof, and the provision of guideways on the casing walls for the lateral edges of the screen.

The fabric used for these belts is preferably a fine weave cloth with a nap on one side. The lateral edges thereof are secured between the edges of a strip of tape 13 (Fig. 4), secured around cables or cords 14. These belt-shaped screens move around a single roller 15 arranged at one side of each of the air outlets 4, and a pair of rollers 16 and 17 parallelly arranged at the opposite sides of the openings in spaced relation. An idler 18 is suspended in the screens between the rollers 16 and 17 by which said screens are kept taut. The ends of the rollers 15, 16, and 17 are beveled as shown at 18 (Fig. 3) so as to coact with the cables 14 and force the lateral edges of the screens into contact with the adjacent walls of the casing. Between the rollers 15 and 16 and 17 strips 19 and 20 are secured to the side walls of the casing so as to provide guideways 21 adapted to receive the tape-covered cables 14, and thus coact with the bevel-ended rollers in providing a substantially air-tight juncture of the casing with the lateral edges of the screens 11.

The suction nozzles 12 are of the usual construction provided with air suction cleaning systems. One of these nozzles is arranged transversely of each of the screens 11 adjacent the roller 15 to bear against the inner face of the inside lap of the screen. Another nozzle 12 is arranged transversely of each of the screens 11 adjacent the roller 16 to bear against the inside surface of the outside lap. Suitable connections lead from the respective nozzles 12 so that the dust collected from the screens is conveyed to a suitable place to be discharged into the desired receptacles.

The power means herein shown for moving the screens 11 comprises a motor in the form of an air wheel 22 mounted on the top of the casing in a conduit 23 leading to the air inlet 2. A worm and gear 24 connects this air wheel with a shaft 25 (see Fig. 1), which in turn is connected by another worm and gear 26 to one of the lower rollers 15, which in turn is connected by pairs of bevel gears 27, 28 and 29, to the other rollers 15.

Although in the specific embodiment herein shown an air wheel 22 is used, it will, of course, be understood that any other motor may be substituted and similarly connected to drive the belts 11.

The operation of the device herein shown is substantially as follows: The dust-laden air under pressure is driven in through the conduit 23, so that it passes through the inlet 2, conduit 10, and into the interior of the casing 1. As the air enters the interior of the casing the pressure is materially decreased so that considerable of the dust carried in suspension will immediately settle to the bottom and be directed out through the dust outlet 3. Air will pass out through the outlets 4, and in so doing any fine particles of dust will be collected on the screens 11, on the inner face of the inner lap, and on the inner face of the outer lap. As these screens travel in belt-like fashion the dust collected thereon is removed by the suction nozzles 12, and is conveyed to suitable receptacles.

Although but one specific embodiment of this invention has been herein shown and described it will be understood that numerous details of the construction shown may be altered or omitted without departing from the spirit of this invention, as defined by the following claims.

I claim:

1. An air cleaning device comprising a polygonal shaped casing vertically arranged and having an inlet for dust-laden air in the top thereof and an outlet for dust in the bottom thereof and outlets for cleansed air on each of the sides thereof communicating directly with the atmosphere, a fabric screen arranged across each of said air outlets, means coacting with said screens for keeping the meshes thereof open, and an axially arranged open-ended spiral-shaped deflector in said casing connected at its periphery with said inlet and adapted to diffuse the incoming dust-laden air current.

2. An air cleaning device comprising a casing providing a path for a dust-laden air current, an endless fabric screen arranged to travel in belt-like fashion across said path, flexible cables secured to the lateral edges of said screen, and rollers supporting said screen and having the ends thereof beveled so as to coact with said cables and urge the lateral edges of said screen against the adjacent walls of the casing.

3. An air cleaning device comprising a casing providing a path for a dust-laden air current, an endless fabric screen arranged to travel in belt-like fashion across said path, flexible cables secured to the lateral edges of said screen, rollers supporting said screen and having the ends thereof beveled so as to coact with said cables and urge the lateral edges of said screen against the adjacent walls of the casing, and guideways formed on said adjacent casing walls between said rollers and adapted to coact with said beveled roller ends to slidably receive said cables so as to provide a substantially air-tight contact of said lateral belt-edges with said casing walls.

4. An air cleaning device comprising a polygonal shaped casing vertically arranged and having an inlet for dust-laden air in the top thereof and an outlet for dust in the bottom thereof and outlets for cleansed air on each of the sides thereof communicating directly with the atmosphere, rollers arranged at the opposite sides of each of said air outlets, a screen in the form of an endless belt arranged to travel around said rollers across each of said outlets, and an air wheel arranged on said casing in the path of air entering said air inlet, and gearing connecting said air wheel with certain of said rollers.

Signed at Chicago this 13th day of Sept. 1922.

JOHN C. ZEHFUS.